United States Patent [19]

Morlock et al.

[11] 4,449,672

[45] May 22, 1984

[54] MACHINE FOR LOADING AND DISINTEGRATING LARGE BALES OF FORAGE MATERIAL

[75] Inventors: Ruben D. Morlock, Jamestown; Ivyl D. Kopecky, Ypsilanti, both of N. Dak.; Robert R. Anderson, Windsor; Dewey R. Marcy, Greeley, both of Colo.

[73] Assignee: Haybuster Manufacturing, Inc., Jamestown, N. Dak.

[21] Appl. No.: 268,341

[22] Filed: May 29, 1981

[51] Int. Cl.³ .............................................. B02C 18/22
[52] U.S. Cl. .................................. 241/101.7; 241/223; 241/243; 241/186 R
[58] Field of Search ................ 241/101 A, 101.7, 222, 241/223, 243, 89.1, 186 R, 186.4

[56] References Cited

U.S. PATENT DOCUMENTS

| | | | |
|---|---|---|---|
| 2,952,466 | 9/1960 | Carlson et al. | 275/6 |
| 3,966,128 | 6/1976 | Anderson et al. | 241/73 |
| 3,999,674 | 12/1976 | Meitl | 241/101 A X |
| 4,094,427 | 6/1978 | White et al. | 214/505 |
| 4,094,428 | 6/1978 | White et al. | 214/508 |
| 4,101,081 | 7/1978 | Ritter et al. | 241/101.7 |
| 4,134,554 | 1/1979 | Morlock | 241/35 |
| 4,151,961 | 5/1979 | Makofka et al. | 241/101 A |
| 4,218,022 | 8/1980 | Boehm et al. | 241/101.7 |
| 4,227,654 | 10/1980 | Seefeld et al. | 241/34 |

Primary Examiner—Mark Rosenbaum
Assistant Examiner—Timothy V. Eley
Attorney, Agent, or Firm—Kinney & Lange

[57] ABSTRACT

A machine for grinding large bales of forage material is provided with a cradle pivotably mounted on a frame. The cradle is movable to a lowered position in which lifting members can engage a bale of crop material lying on the ground. The cradle can be pivoted to a working position in which gravity directs the bale against a grinder. The discharge of the comminuted forage material from the grinder is controlled by an adjustable deflector. A conveyor urges the bale toward the grinder, and tends to rotate the bale to evenly grind or chop away the outer periphery of the bale.

17 Claims, 4 Drawing Figures

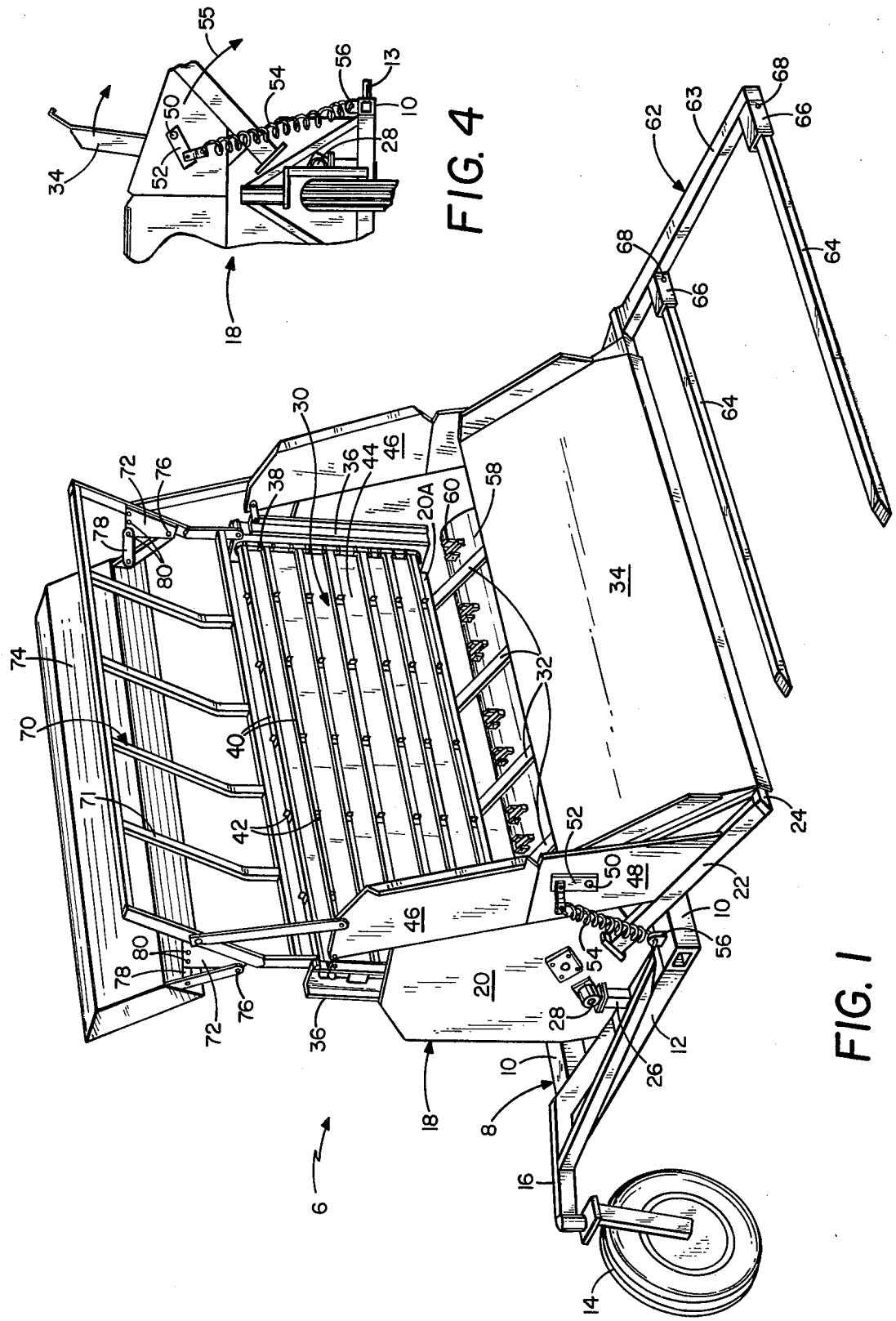

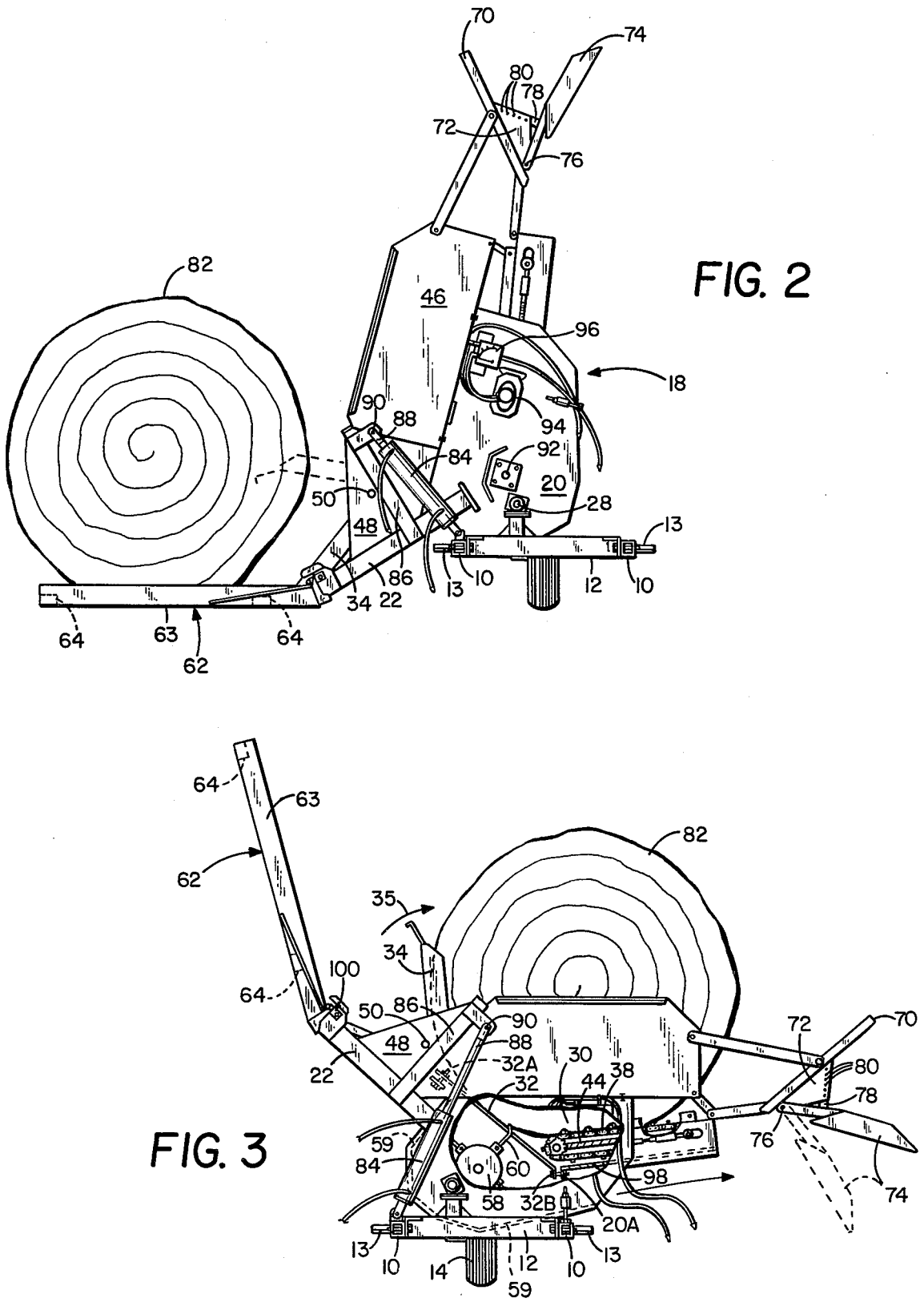

MACHINE FOR LOADING AND DISINTEGRATING LARGE BALES OF FORAGE MATERIAL

BACKGROUND OF THE INVENTION

1. Field of the Invention

The present invention relates to machines for grinding large bales of hay or other animal forage material. The machine in the present invention can pivot to a lowered position to engage a bale which is lying on the ground. The machine can then pivot to a working position in which gravity propels the bale against a rotating grinding cylinder.

2. Description of Prior Art

The basic idea of using knife shredders to disintegrate farm materials is shown in U.S. Pat. No. 2,952,466 to Carlson et al. In this patent, shredders were used on the end of a manure spreader trailer.

Disintegrating means have been used in the prior art to to comminute cylindrical bales of hay or other forage material. Two examples of vehicles using disintegrators are U.S. Pat. No. 4,101,081 to Ritter et al and U.S. Pat. No. 4,227,654 to Seefeldt et al. In both of these patents, bales are carried end first on conveyor along a flat bed, and directed against a disintegrator.

A variation of this type of disintegrator which clamps a bale against flail knives is shown in U.S. Pat. Nos. 4,094,427 and 4,094,428 both to White et al. The invention in these two patents lifts the bale on end from the end of a trailer. Then another member clamps the bale against the disintegrator.

Another version of this style of bale clamp is shown in U.S. Pat. No. 4,151,961 to McKoska et al. The lifting mechanism clamps the bale against the disintegrator. This device uses an auger to discharge material from the machine.

There is a major disadvantage in this style of clamping the bale against the disintegrator. The design requires that force be applied to through hydraulic or other means to keep the bale in position during the disintegrating period. These devices require backing the rear of a trailer under a bale. Bales at the rear of the trailer are much more difficult to align with lifting means. None of these existing devices uses the easy side loading mechanism of the present invention.

None of the prior art relies on gravity for the feeding pressure as does the present invention. Once the bale rests in its cradle, it is ground evenly without spilling.

SUMMARY OF THE INVENTION

The present invention is a machine for loading and grinding or chopping large bales of hay or other forage material which has a bale holding cradle which pivots on an axis parallel to the longitudinal axis of its frame. The cradle can be pivoted to a lowered position to engage a forage bale and then pivoted to a working position where the bale may be chopped or ground and then discharged.

As shown, the bale lifting tines are positioned to one side of the machine and are positioned under a bale to be ground or chopped. The bale is ground by a flail knife rotor which is rotatably mounted on the machine. The bale rests atop provided supports which position the bale so the flail knives will engage a portion of the bale and grind or chop it. A conveyor is provided to urge the bale toward the grinding rotor when the cradle is in its working position and at the same time rotate the bale.

The grinding rotor chops or shreds forage material from the outer edges of the bale and ejects it out of the side of the cradle.

The machine can be easily operated by one person. The backing, loading, and disintegrating can all be done from position sitting in the seat of a tractor. The forage which is comminuted can be ejected into a pile or spread in a windrow, for feeding or for mulching row crops.

BRIEF DESCRIPTION OF THE DRAWINGS

FIG. 1 is a perspective view of one side and the rear portions of a grinder made according to the present invention, in its lowered position;

FIG. 2 is a front end view of the bale grinder in its lowered position;

FIG. 3 is a front end view of the bale grinder with the cradle in working position; and FIG. 4 is a fragmentary view view of the grinder.

DETAILED DESCRIPTION OF THE PREFERRED EMBODIMENT

In FIG. 1 a machine 6 used for grinding large bales of forage material is shown in its lowered, ground engaging position. Machine 6 has a trailer frame 8, comprising longitudinal support members 10 and cross members 12. In the embodiment shown, the rear end of the frame 8 is supported by single wheel 14 which is mounted on wheel support 16 fixed to a cross member 12. The front of the trailer is supported by a tractor hitch and is towed by the tractor during use. As shown, a three point hitch support is provided through hitch pins 13 that are fixed to the forward end of longitudinal members 10.

Machine 6 includes a cradle 18. Cradle 18 is pivotally mounted to the frame 8 on cradle support pedestals 26 at each end of the frame. The cradle has a cradle frame comprising a plurality of longitudinal support members 20A and end plates 20 welded or otherwise attached to the longitudinal members. A pair of arms are fixed to plates 20 and extend laterally from the end plate. The ends of arms 22 are connected together by one or more longitudinal members 24.

A conveyor 30 is mounted on a conveyor frame including side support arms 36, which are attached to end plates 20. In this embodiment, conveyor 30 is a chain and slat conveyor, including chains 38 running on sprockets, which are, in turn, mounted on shafts supported by conveyor support arms 36. Chains 38 support cross slats 40. Teeth 42 project from conveyor slats 40 and engage a bale when the cradle is in its working position. A flat shield 44 is mounted to and extends between arms 36 and is positioned within the loop formed by chains 38. A shield 44 prevents loose hay from falling from the cradle.

A plurality of spaced bale support slats 32 forming a grate-like bale support are attached at their opposite ends 32A and 32B to longitudinal support member of frame 8. As shown in FIGS. 1 and 3, the slats 32 are positioned to partially support a bale of hay which is to be chopped when the cradle 18 is in working position. The ends 32B of the bale support members, closest to the conveyor 30 are adjustable by use of shims so that the height of the bale support slots can be varied.

Cradle 18 also includes end plates 46 and 48 which are attached to the upper edges of plates 20. End plates 48 extend from the end plates 46 and are attached to cradle arms 22. A bale deflector comprises a sheet of material which is suitably reinforced and which is pivotally mounted to extension plates 48 as at 50. The bale deflector extends in fore and aft directions between plates 48. A lever 52 is attached to the pivot support for the bale deflectors and is positioned outside of the rear extension plate 48. Spring 54 is attached to the outer end of lever 52 and also attached to frame 8 as at 56.

The bale deflector 34 pivots between two positions, depending on the position of cradle 18. In FIG. 1, bale deflector 34 is shown in its lowered position resting upon longitudinal member 24. Bale deflector 34 is a solid sheet suitable for supporting a bale as it rolls into cradle 18. FIGS. 3 and 4 show the bale deflector in working position.

When cradle 18 is shown in its working position (FIG. 4), spring 54 is extended, applying a load on lever 52. The load applied to lever 52 urges the bale deflector 34 about its pivot axis tending to move the deflector 34 in direction as indicated by arrow 35 in FIG. 3. The bale deflector moves to upright position as shown and prevents loose forage material from flying out of the cradle 18 and also forming a spring loaded restraint for a bale being ground. A stop can be provided to limit the pivotal movement of the bale deflector.

When cradle 18 is pivoted to its lowered position, the tension on spring 54 is released as can be seen in FIG. 4. This is because point 56 is lower than that the pivot axis of members 28 and the pivoting of cradle 18 in direction indicated by arrow 55 causes the shaft 50 to move closer to point 56, relaxing the spring. When spring 54 relaxes, lever 52 no longer had any load applied to it and the bale deflector 34 lowers under gravity down against longitudinal member 24, as shown in FIG. 1. As will be explained, in this position the deflector forms a ramp for loading a bale.

In the bottom of cradle 18 a shredding or chopping rotor 58 is rotatably mounted on end plates 20. Shredding rotor 58 includes swinging flail knives 60. Flail knives 60 are mounted on pivots so that they can swing about axes parallel to the rotating axis of shredding rotor 58. In FIG. 1, flail knives 60 are shown at rest in their lowered position. As rotor 58 spins, flail knives 60 are whipped out by centrifugal force and fit between the bale support straps 32, thereby chopping at the bottom of a bale which is supported on bale support straps and on conveyor 30 in cradle 18. The plates 20 also support a suitable curved plate 59 which forms a housing for the rotor to guide chopped material in its desired path.

A bale lifting fork 62 is attached to and extends from the end of the forward of the two cradle arms 22. Bale fork 62 has two spaced parallel tines 64, which slide under and engage a large cylindrical hay bale lying on the ground. Tines 64 slide into tine housings 66 which are fixed to a lateral member 63 and are held in place by pins 68.

A guard frame 70 which is formed of spaced bars 71 is pivotally mounted on the conveyor support arms 36 and is braced back to plates 64. The frame 70 is inclined upwardly when the cradle is in working position and forms a stop to prevent a bale from rolling out during use. A pair of quadrant type adjustment plates 72 are attached to the end members of the frame 70. A discharge deflector or hood 74 is attached to adjustment plates 72 by fastener or bolts 76 and pivots relative to the plate 72. The discharge deflector 74 is also attached to adjustment plates 72 at second locations by means of straps 78. The adjustment plates 72 have a series of holes 80 as the deflector pivots on fasteners 76. This attachment can be seen in FIG. 3.

The two positions of the cradle 18 for loading and grinding a hay bale are shown respectively in FIGS. 2 and 3. These views are shown from the front end (hitch end) of the machine 6. In FIG. 2, the machine is shown in its lowered position, with the tines of the fork 62 under a large cylindrical hay bale 82, which lies on the ground. With cradle 18 in its lowered position, as in FIG. 2, frame 8 is backed up by a towing vehicle so that tines 64 slide underneath bale 82. In the figures, bale 82 is shown as a cylindrical bale, but bale lifter 62 will also engage and lift other types of bales. Further, a mechanism which grips a bale may be used if desired.

In FIG. 2, bale deflector 34 is shown in its lowered position. The deflector forms a guide from adjacent the bale support slats 32 and the grinding cylinder out to the bale lifting tines. Once bale 82 is engaged, cradle 18 is pivoted about its pivot axis defined by the pivot mountings 28. This is done by operating a hydraulic cylinder 84, the base end of which is connected to an ear on cross member 12 of frame 8. A support member 86 is attached to cradle arm 22. The rod end 88 of hydraulic cylinder 84 is pivotably attached to support member 86 as at 90. With the cradle 18 in position as shown in FIG. 2, when hydraulic cylinder 84 is actuated and rod end 88 is extended, the cradle 18 is pivoted to its working position, as shown generally in FIG. 3. Note that the bale deflector 34 forms a bale ramp as the bale rolls from the tines into the center of the cradle during this pivoting. After the cradle has moved to its upright working position in FIG. 3, the bale deflector is under a spring load, as shown in FIG. 4, and is urged against the bale in the cradle.

As shown in FIG. 3, bale 82, while the cradle is in its working position, is supported partially by bale support slats 32 and partially by conveyor 30 (and is also guided by deflector 34). The chopping or shredding of bale 82 is accomplished by shredding rotor 58. In this view, shredding rotor 58 would rotate in a counterclockwise direction and has a center shaft 92 which is connected to and driven by the power take off of a tractor used to tow the frame. As shredding rotor 58 spins, flail knives 60 are swung away from rotor 58 by centrifugal force, passing between the bale support slots 32 and chopping at the outer peripheral portion of bale 82. The degree to which flail knives chew into bale 82 is controlled by a shim adjustment of the height of bale support slats 32. Bale 82 is urged towards the shredding rotor 58 by a conveyor 30. In this view, the cutaway shows one chain 38, the upper length of which moves toward the slats 32. The conveyor slats 40 move the bale and tend to cause it to rotate as the conveyor 30 is powered and the rotor 58 is also powered. The bale support slats 32 are inclined and the bale will rotate on these supports.

Conveyor 30 is driven by a hydraulic motor 94 from a hydraulic pump usually powered by the tractor as well. The speed at which the bale 82 is chopped and the length of the resulting forage pieces are determined by the combination of the exposure of flail knives 60 to the bale (penetration into the bale) and the speed of movement of the conveyor 30. Shredding rotor 58 is partially encircled by the rotor housing 59 as shown in dotted lines in FIG. 3. As shredding rotor 58 rotates, chopped forage from bale 82 is directed around into a counterclockwise direction by rotor housing 59 and ejected from the side of the cradle 18, in a direction toward discharge deflector 74. A lower deflector plate 98 is positioned under conveyor 30 to guide chopped material outwardly and to shield the conveyor from the chopped material. The opening from the grinding or chopping rotor is defined by the lower edge of housing plate 59 and the deflector plate 98.

The direction of the discharge of the chopped material and the formation of a windrow on the ground is controlled by adjustable discharge deflector 74. When discharge deflector 74 is in the raised position as shown in FIG. 3, chopped forage from the bale will be directed out into a pile. When discharge deflector 74 is lowered, forage will be deflected down towards the ground. Forage is spread along the ground in a windrow by towing frame 8 with discharge deflector 74 in its lowered position. This is very effective for spreading a mulch on crops such as strawberries when a straw bale is chopped.

Safety guard 70 insures that bale 82 will not roll off the cradle when the cradle 18 is pivoted to its working position. In the working position, no support is needed for bale 82 except the force of gravity urging it against bale support slats 32 and conveyor 30.

The laterally extending parts of the apparatus can be folded for travel on highways or other areas where narrow clearance is required. Bale lifter 62 is pivotably attached at 100 to cradle arms 22. For highway travel, the bale lifter 62 can be folded inwardly, pivoting about point 100 to points above the frame. Bale safety guard 70 and discharge deflector 74 can also be folded upward for highway travel to reduce the travel width.

What is claimed is:

1. A machine for grinding large bales of forage material comprising a support frame;

bale support means mounted on said frame and positioned so that a bale supported on said bale support means is urged under gravity to a first location on the bale support means said bale support including a movable conveyor moving in a direction tending to rotate the bale supported on said movable conveyor;

rotary bale grinding means mounted on the frame in position generally below the bale support means and positioned to engage a bale supported in the first location;

said bale support means including means on a lateral side of the bale grinding means and overlying the bale grinding means and inclining upwardly from a low point above the axis of the bale grinding means for guiding and supporting a bale in position on the bale support means to have the periphery of such bale engaged by the bale grinding means, and means on said frame adjacent said rotary bale grinding means providing a guide wall extending around and below the rotary bale grinding means for guiding ground material ground by the bale grinding means to form a laterally facing outlet opening positioned below the level of the bale support means and extending along substantially the entire length of said bale grinding means to eject material laterally of the support frame in a direction generally perpendicular to the axis of the bale grinding means.

2. The apparatus of claim 1 wherein said bale support means further includes upwardly inclined members against which the bale rests with the bale support means in the first location, said movable member thereby tending to rotate the bale against said upwardly inclined members.

3. A machine for chopping large bales of forage material comprising:

a frame with a longitudinal axis;

means on one end of the frame for connection to a prime mover for movement of the frame in direction along the longitudinal axis;

a flail rotor having a central shaft mounted for rotation on the frame about an axis parallel to the longitudinal axis and being adapted to be driven by a power take off of a prime mover, the flail rotor having flail knives that extend outwardly under centrifugal force as the rotor is driven; bale support means comprising a plurality of bale support slats supported on the frame above at least portions of the rotor to form a bale support plate positioned so that the tips of the flail knives pass between adjacent slats and outwardly of the bale support plane;

a cradle pivotally mounted on the frame for movement about an axis generally parallel to the longitudinal axis of the frame and parallel to the axis of the flail rotor, the cradle comprising a bale lifting structure; and means to pivotally move said cradle between a first working position and a lowered position in which the bale lifting structure is positioned near the ground, and in which lowered position said bale lifting structure is positioned laterally of the frame and is adapted to engage a bale positioned on the ground as the frame is moved to location adjacent such bale;

said frame including means defining a guide panel extending along the length of the rotor and partially surrounding the rotor and defining a chopped material outlet opening facing laterally from the rotor and extending along the longitudinal axis so that material engaged by the flail knives is discharged laterally along the length of the rotor;

said bale lifting structure lifting an engaged bale above the rotor axis and above at least portions of the bale support slats so that when the cradle is moved to its working position such bale is moved sufficiently high so that it is urged by gravity toward the bale support slats wherein it is engaged by the flail knives of the rotor, and material chopped by the flail knives is guided out through the outlet opening.

4. The apparatus of claim 3 wherein the bale lifting structure has two tines which are parallel to the longitudinal axis of the frame.

5. The apparatus of claim 3 and an adjustable deflector positioned on the frame relative to the outlet opening for deflecting chopped material from the rotor after it has been discharged through the outlet opening.

6. The apparatus of claim 3 further comprising a conveyor mounted on the frame at one side of the rotor and adapted to partially support a bale on the bale support means and to urge such a bale toward the slats.

7. The apparatus of claim 6, further comprising a bale deflector mounted on the cradle in a working position on the opposite side of the rotor from the conveyor tending to retain a bale from movement laterally off the bale support slats.

8. The apparatus of claim 7, wherein the bale deflector is pivotally mounted on the cradle and moves to a loading position extending between the bale lifting structure and the bale support slats when the cradle is in its lowered position to provide a support for a bale to be loaded to roll from the bale lifting structure toward the rotor when the cradle is pivoted from lowered position to working position.

9. The apparatus of claim 8, wherein a bias means urges the bale deflector in direction toward its working position and against a bale when the cradle is in its working position.

10. The apparatus of claim 6 wherein said cradle includes transversely extending front and rear plates having planes generally perpendicular to the longitudinal axis of the frame, said rotor being mounted between said plates, and means to mount said bale support slats to the cradle, the axis of pivot of the cradle being offset from but adjacent the axis of rotation of the rotor.

11. The apparatus of claim 3 wherein the bale support comprises two or more spaced support slats.

12. The apparatus of claim 3 wherein the bale support slats are adjustable to change the position of the slats in relation to the rotor.

13. The apparatus of claim 3 wherein the grinding means comprises a rotor having a plurality of knives mounted thereon.

14. The apparatus of claim 3 wherein the means to pivotally move the cradle comprises a hydraulic cylinder.

15. The apparatus of claim 3 wherein the frame has wheel means mounted thereon at the opposite end of the frame from the means at one end to support the frame for movement along the ground.

16. A mobile machine for loading and chopping large bales of forage material including:
   a support frame having a longitudinal axis, a leading end and a trailing end, means at the leading end for mounting said support frame to a prime mover having a power take off, and caster wheel means at the rear end of said support frame for supporting said rear end for movement along the ground in direction of the longitudinal axis when the prime mover is moved;
   a flail type rotor mounted relative to said support frame for rotation about an axis generally parallel to the longitudinal axis extending a substantial length from the leading end toward the trailing end of said support frame and being positioned adjacent lower portions of said frame;
   means supporting a bale support structure mounted on said frame relative to said rotor of size to support a bale of forage material for movement toward the rotor and extending along the length of said rotor and above the axis of said rotor and arranged so that gravity tends to hold the bale in position on the bale support structure to be engaged by the flail rotor for shredding material from the bale;
   means on said frame partially surrounding said rotor and extending below said rotor providing a guide wall for shredded material and cooperating with the bale support means to provide an outlet opening extending along substantially the length of said rotor to eject material in a direction laterally of the direction of movement of said support frame;
   a cradle member including a bale engaging structure;
   means to pivotally mount said cradle member relative to the frame for pivotal movement about a pivot axis generally parallel to the longitudinal axis of said support frame, said bale engaging member extending laterally from said pivot axis, said cradle being movable about said pivot axis from a position wherein said bale engaging member is adjacent the ground and positioned laterally of below and alongside said support frame, to a position wherein said bale engaging member engages and support a bale and is moved about the pivot axis of said cradle member to a position raised above working portions of the flail type rotor so that a bale supported on the bale engaging member will move therefrom under gravity into a position on the bale support structure wherein the lower portions of said bale may be engaged by the flail type rotor for shredding; and
   a first portion of the bale support structure comprising an upwardly inclined slotted support overlying a portion of the flail type rotor and a second portion of said bale support structure comprising a conveyor engaging the lower portions of said bale and being powered to move such lower portions in a direction tending to urge said bale against said upwardly inclined slotted support overlying the rotor and through which flails of the rotor extend when the rotor is powered to shred the outer peripheral portions of such bale, said shredded material being guided by said guide wall to discharge substantially along the length of said rotor laterally through said outlet opening.

17. A machine for grinding large bales of forage material comprising a support frame;
   bale support means mounted on said frame and positioned so that a bale supported on said bale support means is urged under gravity to a first location on the bale support means;
   rotary bale grinding means mounted on the frame in position generally below the bale support means and positioned to engage a bale supported in the first location;
   said bale support means including means on lateral sides of the bale grinding means inclining upwardly from the bale grinding means to guide and support a bale in position on the bale support means to have the periphery of such bale engaged by the bale grinding means; and
   means on said frame adjacent said rotary bale grinding means providing a guide wall for guiding ground material ground by the bale grinding means to provide a laterally facing outlet opening positioned below the level of the bale support means and extending along the length of said bale grinding means to eject material laterally of the support frame;
   the means inclining upwardly comprising a plurality of spaced apart slats inclining upwardly in a first direction relative to the rotary bale grinding means axis of rotation, and a movable conveyor member having a movable portion extending to one side from the bale grinding means adapted to engage a bale in the first location on a lower surface of such bale and to move in direction toward the slats to tend to urge such bale to rotate relative to and along the slats as the conveyor member is moving to thereby present different portions of a bale supported in the first location to be ground by the bale grinding means.

* * * * *

UNITED STATES PATENT AND TRADEMARK OFFICE
CERTIFICATE OF CORRECTION

PATENT NO. : 4,449,672

DATED : May 22, 1984

INVENTOR(S) : Ruben D. Morlock et al.

It is certified that error appears in the above-identified patent and that said Letters Patent is hereby corrected as shown below:

Column 7, line 45, (Claim 16, line 17), "supporting" should be --forming--; Column 8, line 5, (Claim 16, line 42), "support" should be supports--.

Signed and Sealed this

Ninth Day of October 1984

[SEAL]

Attest:

GERALD J. MOSSINGHOFF

Attesting Officer

Commissioner of Patents and Trademarks